(12) United States Patent
Harutyunyan et al.

(10) Patent No.: US 6,730,284 B2
(45) Date of Patent: May 4, 2004

(54) METHOD FOR PRODUCING CARBONACEOUS ARTICLES

(75) Inventors: Avetik R. Harutyunyan, State College, PA (US); Leonid Grigorian, Arvada, CO (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 140 days.

(21) Appl. No.: 09/880,798

(22) Filed: Jun. 15, 2001

(65) Prior Publication Data

US 2001/0053344 A1 Dec. 20, 2001

Related U.S. Application Data

(60) Provisional application No. 60/212,192, filed on Jun. 16, 2000.

(51) Int. Cl.⁷ .................................................. D01F 9/12
(52) U.S. Cl. .................................. 423/447.3; 423/447.1
(58) Field of Search ....................... 423/447.3, 447.1, 423/445 B, 445 R

(56) References Cited

U.S. PATENT DOCUMENTS

| | | |
|---|---|---|
| 4,663,230 A | 5/1987 | Tennent |
| 5,149,584 A | 9/1992 | Baker et al. |
| 5,165,909 A | 11/1992 | Tennent et al. |
| 5,547,748 A | 8/1996 | Ruoff et al. |
| 5,593,740 A | 1/1997 | Strumban et al. |
| 5,653,951 A | 8/1997 | Rodriguez et al. |
| 5,780,101 A | 7/1998 | Nolan et al. |
| 5,866,434 A | 2/1999 | Massey et al. |
| 5,872,422 A | 2/1999 | Xu et al. |
| 5,973,444 A | * 10/1999 | Xu et al. .................... 313/309 |
| 5,997,832 A | 12/1999 | Lieber et al. |
| 6,099,965 A | 8/2000 | Tennent et al. |
| 6,333,016 B1 | * 12/2001 | Resasco et al. .......... 423/447.3 |

FOREIGN PATENT DOCUMENTS

EP 0056004 B1 1/1986

OTHER PUBLICATIONS

Nelly M. Rodriguez et al., "Catalytic Engineering of Carbon Nanostructures", Langmuir 1995, vol. 11, pp. 3862–3866.
Colin Park et al., *"Catalytic Behavior of Graphite Nanofiber Supported Nickel Particles"*, 2. *"The Influence of the Nanofiber Structure"*, J. Phys. Chem. B., vol. 102, No. 26, 1998, pp. 5168–5177.
*"Is it all just a pipe dream?"* Nature, vol. 410, Apr. 12, 2001, pp. 734–135.
Jing Kong, et al., *"Chemical vapor deposition of methane for single–walled carbon nanotubes"*, Chemical Physics Letters 292, Aug. 14, 1998, pp. 567–574.

* cited by examiner

Primary Examiner—Stuart L. Hendrickson
Assistant Examiner—Peter J Lish
(74) Attorney, Agent, or Firm—McDermott, Will & Emery

(57) ABSTRACT

An apparatus for the production of elongated carbonaceous article includes a chamber having at least one heating element, a catalyst and a device for generating a magnetic field in proximity to or around the catalyst. In operation, a carbon-containing precursor is introduced to the chamber to contact the catalyst with a sufficient amount of heat to cause the deposition of carbon on the catalyst. Continual deposition of carbon over time forms elongated carbon structures, such as carbon fibers and carbon nanotubes. By operating the device to magnetically confine the catalyst during the formation of the carbon structures, migration of catalyst is reduced or prevented thereby minimizing contaminants in the produced products and improving the useful life of the catalyst.

11 Claims, 3 Drawing Sheets

METHOD FOR PRODUCING CARBONACEOUS ARTICLES

RELATED APPLICATION

The present application claims priority to U.S. Provisional Application Ser. No. 60/212,192 filed Jun. 16, 2000 and entitled "METHOD AND APPARATUS FOR INCREASED YIELD OF CARBON FIBERS AND SINGLE-WALL CARBON NANOTUBES SYNTHESIZED BY CHEMICAL VAPOR DEPOSITION", the entire disclosure of which is hereby incorporated in its entirety herein by reference.

FIELD OF THE INVENTION

The present invention relates to a method and apparatus for the production of elongated carbonaceous articles. The present invention has particular applicability in manufacturing carbonaceous articles, such as carbon fibers and carbon nanotubes in high yields and throughput.

BACKGROUND

Carbonaceous materials, in general, enjoy wide utility due to their unique physical and chemical properties. Recent attention has turned to the use of elongated carbon-based structures, such as carbon filaments, carbon tubes, and in particular nanosized carbon structures. It has been shown that these new structures impart high strength, low weight, stability, flexibility, good heat conductance, and a large surface area for a variety of applications.

Of growing commercial interest is the use of single-wall carbon nanotubes to store hydrogen gas, especially for hydrogen-powered fuel cells. It is anticipated that hydrogen-powered fuel cells can offer advantages over traditional gasoline powered transportation. By current estimates, a hydrogen-powered automobile would require about 3 kg of hydrogen gas to have the equivalent 400 mile driving range as that of conventional gasoline powered automobiles. Since it is believed that nanotubes can store approximately 7–8% of hydrogen by weight relative to carbon, a hydrogen-powered automobile would require approximately 40 kg of carbon nanotubes to store a sufficient amount of hydrogen to power the typical automobile. The best-known techniques, however, for producing single-wall carbon nanotubes and carbon fibers produce only approximately 4 g of carbon nanotubes per day at a prohibitively high cost.

The formation of carbon filaments through catalytic decomposition of hydrocarbons is known. For example, U.S. Pat. No. 5,165,909 to Tennent et al. disclose the production of carbon fibrils characterized by a substantially constant diameter and a length greater than about 5 times the diameter by continuously contacting metal particles with a gaseous, carbon-containing compound to catalytically grow the fibrils. European Patent 56,004B1 to Yates et al. discloses methods of preparing iron oxides for the production of carbon filaments. U.S. Pat. No. 5,780,101 to Nolan et al. discloses methods of producing highly crystalline nanotubes by the catalytic disproportionation of carbon monoxide in the substantial absence of hydrogen.

U.S. Pat. Nos. 5,872,422 and 5,973,444 both to Xu et al. disclose carbon fiber-based field emission devices, where carbon fiber emitters are grown and retained on a catalytic metal film as part of the device. Xu et al. disclose that the fibers forming part of the device may be grown in the presence of a magnetic or electric field, as the fields assist in growing straighter fibers.

One particular problem associated with conventional carbon-fiber forming techniques is that the catalysts used to facilitate the production of carbon nanotubes or carbon fibers often migrate with the growth of the nanotubes and contaminate the produced products. Therefore, the carbon fibers or carbon nanotubes must be treated, such as with nitric acid, to remove the catalyst and purify the products. This treatment, of course, impedes the production process of carbon-based products and chemically destroys a significant portion of the production of carbon nanotubes (up to 80–90% by some estimates). Also, the catalyst is lost during the process since it is not reusable after acid treatment and, thus, yield of carbon per catalyst particle is particularly low.

Accordingly, a need exists for the efficient manufacture of carbonaceous articles, in particular nanosized carbon-based articles in high yield, throughput and purity.

BRIEF SUMMARY OF THE INVENTION

An advantage of the present invention is an apparatus for producing carbonaceous articles in high yield, purity and efficiency.

Another advantage of the present invention is a method of manufacturing carbonaceous articles with high efficiency and a reduced need for further purification.

Additional advantages and other features of the present invention will be set forth in the description which follows and in part will be apparent to those having ordinary skill in the art upon examination of the following or may be learned from the practice of the present invention. The advantages of the present invention may be realized and obtained as particularly pointed out in the appended claims.

According to the present invention, the foregoing and other advantages are achieved in part by an apparatus for manufacturing carbonaceous articles. The apparatus comprises a chamber having at least one heating element and at least one port for introducing a precursor to the chamber. The heating element can be any element useful for heating the contents of the chamber and the port can be a gas inlet port, for example. A metal catalyst is disposed in the chamber that is capable of converting the introduced precursor to a carbonaceous article. The catalyst can be in free form or supported in the chamber.

In accordance with the present inventive apparatus, a device is positioned near the metal catalyst that is capable of generating a magnetic field. The magnetic field is useful for affecting or influencing the catalyst as by substantially inhibiting the mobility of the metal catalyst during the formation of the carbonaceous article from the precursor. The apparatus of the present invention advantageously restricts the mobility of the catalyst thereby reducing contamination of the produced products and improves efficiency and yield of products per catalyst by reducing the loss of the catalyst in the products.

Embodiments of the present invention include an apparatus comprising a second chamber disposed within the chamber; a catalyst bed disposed in the chamber; and a stationary magnet at a distance so as to influence the catalyst bed, wherein the catalyst bed comprises the metal catalyst supported on a porous substrate and wherein the metal catalyst comprises a nickel, cobalt or iron-based catalyst or mixtures thereof.

Another aspect of the present invention is a method of a manufacturing a carbonaceous article, e.g. a carbon nanotube. The method comprises contacting a carbon-containing precursor with a catalyst to form the carbonaceous article; applying a magnetic field near the catalyst during the formation of the carbonaceous article; and separating the formed carbonaceous article from the catalyst.

The inventive method advantageously produces carbonaceous articles, such as carbon fibers and tubes, without the need for further purification thereby minimizing product loss due to purification processes. By magnetically preventing catalyst migration, yield is also improved reducing the need to re-seed the catalyst thereby improving throughput.

Embodiments of the present invention comprise forming a nanostructured carbonaceous article by contacting a carbon-containing precursor with a nanosized metal catalyst at elevated temperatures, e.g. from about 100° C. to about 1000° C., while applying a magnetic field of at least about 100 gauss near the catalyst.

Another aspect of the present invention is a method of a using a catalyst for producing carbonaceous articles, the method comprising contacting a carbon-containing precursor with a catalyst bed to form a first carbonaceous article; applying a magnetic field near the catalyst bed during the formation of the first carbonaceous article; separating the formed first carbonaceous article from the catalyst bed and reusing the catalyst to form a second carbonaceous article. The method of the present invention advantageously reduces the need to re-seed the catalyst bed thereby increasing the efficiency of the process.

Another aspect of the present invention is a carbonaceous article, e.g. a nanosized carbon fiber or tube, having an elongated portion with an aspect ratio of no less than 2 and having opposing proximal and distal ends. Embodiments include where the elongated portion and ends comprise no less than 90 atomic percent (at. %) of carbon and are substantially free of catalyst, e.g. metals and their salts. The carbonaceous articles of the present invention can be formed having less than 10 weight percent (wt %) of metal impurities, e.g. less than about 5 wt % of metal impurities, without the need for acid purification.

Additional advantages of the present invention will become readily apparent to those skilled in this art from the following detailed description wherein embodiments of the present invention are described simply by way of illustrated of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

BRIEF DESCRIPTION OF THE DRAWINGS

The various features and advantages of the present invention will become more apparent and facilitated by reference to the accompanying drawings, submitted for purposes of illustration and not to limit the scope of the invention, where the same numerals represent like structure and wherein.

DESCRIPTION OF THE INVENTION

Figure 1:
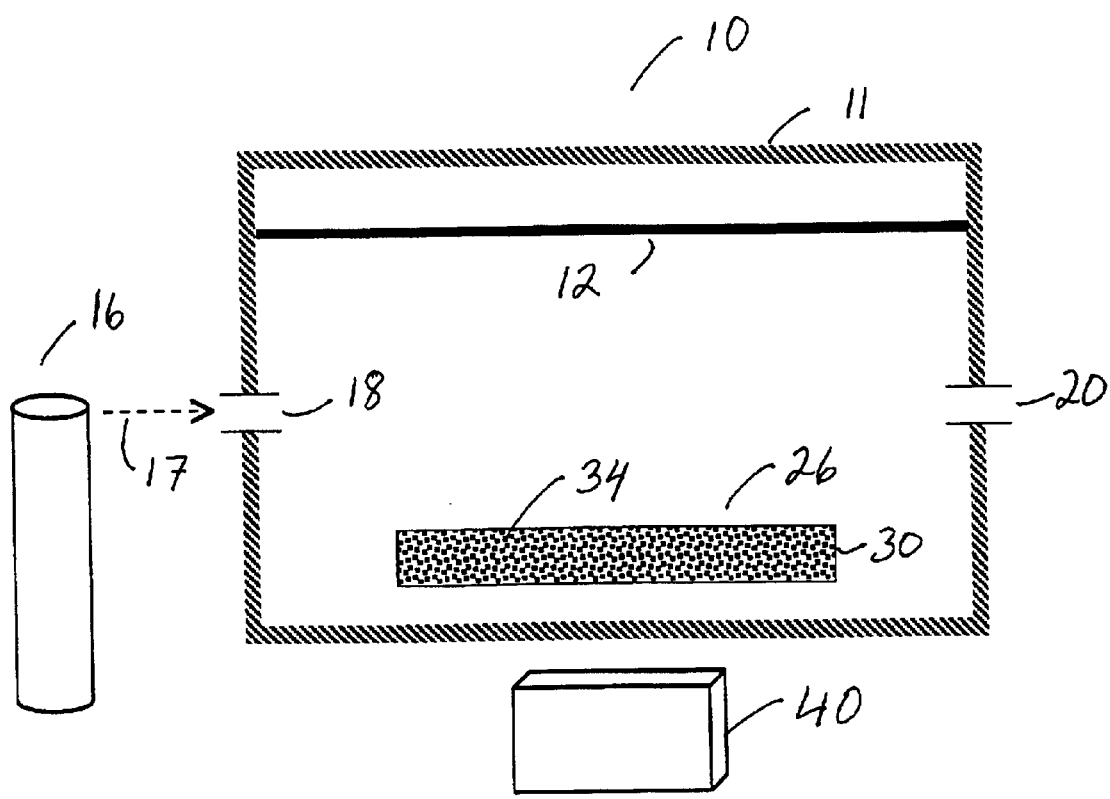
FIG. 1 shows a schematic view of an apparatus in accordance with the present invention.

The present invention addresses and solves various yield and processing problems arising in fabricating elongated carbonaceous articles by providing an efficient and facile methodology enabling the fabrication carbon-based structures. The present invention contemplates a new technique to substantially inhibit if not eliminate the mobility of catalyst during the formation of such products. The invention is simple in design, effective in use, and overcomes many difficulties while increasing the yield of carbon product per catalyst by increasing its reusability. The present invention advantageously reduces or completely eliminates the need for a purification treatment step to remove catalyst contaminants from the produced nanotubes or fibers and provides a method of mass producing carbon nanotubes and carbon fibers with high efficiency.

In accordance with the present invention, carbonaceous articles are formed by contacting a carbon-containing precursor with a catalyst. During formation of the carbonaceous article, a magnetic field is applied to substantially fix the catalyst in place thereby preventing the catalyst from contaminating the formed products. In part, the type of carbonaceous article formed depends on the type and nature of the catalyst used in the process. For example a nanosized catalyst, i.e. a catalyst having a displacement of less than one micron, can form a nanosized structure.

The carbonaceous articles manufactured in accordance with the present invention can take any elongated form, such as that of a fiber, fibril, filament etc. It is understood that the terms "carbon filaments", "carbon whiskers", "carbon nanofibers", and "carbon fibrils", are sometimes used interchangeably by those in the art, all of which however, are herein contemplated by the present invention. The elongated forms can be of any morphology, such as straight, branched, twisted, spiral, helical, coiled, ribbon-like, etc. and have a length of a few nanometers (nm) to several hundred microns. In an embodiment of the present invention, the elongated carbonaceous article has a length to width ratio (an aspect ratio) of no less than 2, e.g., has an aspect ratio of at least 5 or higher.

The inner core of these articles can be solid, hollow or can contain carbon atoms that are less ordered than the ordered carbon atoms of the outer region. The carbonaceous article of the present invention can be in the form of a tube, and in the size of a carbon nanostructure such as those selected from nanotubes, single-walled nanotubes, hollow fibrils, nanoshells, etc. The nanostructures used in the present invention can have a cross-section or diameter of less than 1 micron, e.g. from about 0.1 nm to less than 1,000 nm, e.g., from about several nm to about 500 nm. In en embodiment of the present invention the cross-section of a nanostructured carbonaceous article is from about 1 nm to about 150 nm.

The apparatus for the production of elongated carbonaceous structures of the present invention includes a chamber having at least one heating element, a catalyst and a device for generating a magnetic field in proximity to or around the catalyst. In operation, a carbon containing precursor, e.g. a $C_{1-18}$ hydrocarbon, is introduced to the chamber and in contact with the catalyst with the application of heat. It is believed that contacting the precursor with the heated catalyst causes the precursor to decompose and precipitate as carbon, and over time, form carbonaceous articles having elongated structures. By operating the device to magnetically confine the catalyst during the process, contamination of the carbon-based products by the catalyst is substantially reduced or eliminated and the useful life of the catalyst extended.

Figure 2:
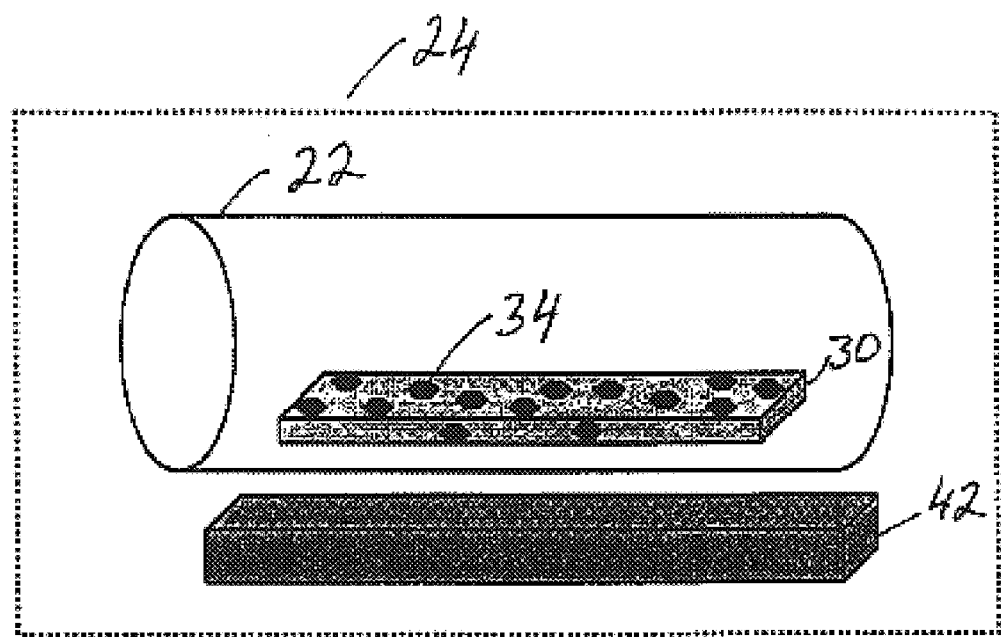
FIG. 2 illustrates an embodiment of the inventive apparatus.

The inventive apparatus can take physical form in certain parts and arrangements of parts. In FIGS. 1–2, an apparatus according to an embodiment of the present invention is illustrated. As shown in FIG. 1, apparatus 10 includes chamber 11 and at least one heating element 12, e.g. the combination of chamber 11 and heating element 12 can be a commercially available furnace, such as available from Carbolite of Great Britain. Heating element 12 can be any type of element capable of heating the contents of chamber 11 and includes equivalents to typical resistance/conduction heating elements. Chamber 11 includes at least one port for introducing the precursor to the chamber.

In an embodiment of the present invention chamber 11 is in fluid communication 17 with carbon-containing precursor source 16 through at least one inlet port 18 located on chamber 11. Source 16 can be in the form of a tank or container suitable for holding and dispensing precursor materials therefrom to chamber 11. In an embodiment of the present invention, the carbon-containing precursor is metered in to chamber 11 from source 16 through inlet port 18 in gaseous form. In practicing the invention, the carbon containing precursor can be diluted or mixed with an inert gas, such as argon, or with other useful compounds currently known or their equivalence for the process of forming carbonaceous articles. For example, hydrogen can be added, prior to, after or concomitantly during the introduction of the precursor in to chamber 11.

Chamber 11 can also include a second port, e.g. exit port 20, for exhaust gases or to attach another device in fluid communication with chamber 11, e.g., a vacuum pump to reduce the pressure within the chamber or to aid in the evacuation of gases. In accordance with the present inventive apparatus, the catalyst is disposed within chamber 11 and can be freely disposed in chamber 11 or be deposited on a porous substrate, to support the catalyst, as in a catalyst bed. The substrate can be in a form of a sheet, a fiber, and a powder. As shown in the embodiments of FIGS. 1–2, catalyst 34 is supported on sheet-like substrate 30, e.g. a porous ceramic, to define a catalyst bed 26 in chamber 11.

In accordance with the present inventive apparatus, at least one device for generating a magnetic field is placed near catalyst 34 in chamber 11. The device can be positioned outside of chamber 11, attached on the outer surface of the chamber, disposed within the chamber at a distance away from the catalyst, or can be affixed to the catalyst. Any device capable of generating a magnetic field at or near the catalyst can be used in the present inventive apparatus and can include, for example, a single magnet or a set of magnets. The magnetic device can be stationary or mobile and can comprise at least one permanent and/or one electromagnet and equivalents thereof. The strength of the magnetic field generated by the device, at a minimum, should be high enough to influence the catalyst and at a maximum, the field should not substantially disrupt the process. In one aspect, the magnetic field generating device of the present invention can generate a magnetic field of about 100 gauss to as high as about 5,000 gauss or higher, as it is believed that a higher magnetic field could be used with the present inventive apparatus and methods. In an embodiment of the present invention, the magnetic device comprises a stationary magnet that can generate a field of no less than about 100 gauss, e.g., a field of about several hundred gauss or higher.

In an embodiment of the present invention, the magnetic field generated by the device prevents the catalyst from contaminating the produced carbon-based products, e.g. inhibits catalyst 34 from migrating or drifting away from substrate 30 during the process. The device should be close enough to affect the catalyst and its distance therefrom will depend on such factors as the strength of the magnetic field generated by the device and its location relative to potentially shielding or interfering structures. It is contemplated that the device can be directly attached to the catalyst or at a distance of several meters or more from the catalyst. As illustrated in the embodiment of FIG. 1, magnetic field generating device 40 is attached to chamber 11 and beneath catalyst bed 26 at a distance of about 4 millimeters (mm) to about 6 mm from the catalyst.

In an embodiment of the present invention, a second chamber such as a quarts tube, can be disposed in or housed by chamber 11. As shown in FIG. 2, second chamber 22 houses catalyst bed 26 containing catalyst 34 on substrate 30. As shown in the embodiment, stationary permanent magnet 42 is placed below the substrate 30 outside of second chamber 22 to act on catalyst 34 on substrate 30. The combination of second chamber 22, catalyst bed 26 and magnet 42 loosely defines reaction zone 24. In this embodiment, the entire reaction zone is disposed in chamber 11 (not shown for illustrative convenience) such that magnet 42 is disposed within chamber 11 and outside of chamber 22.

The inventive apparatus described by way of the above embodiments can be used to mass produce carbonaceous article, such as carbon nanotubes, for commercial, industrial, and research applications. The various features and advantages of the present invention will become more apparent and facilitated by a description of its operation. As described above, the present inventive apparatus includes a chamber having a heating element, a catalyst and a device for generating a magnetic field.

Carbon-containing precursors suitable for use in the practice of the present invention are compounds comprising mainly atomic carbon and hydrogen, such as hydrocarbons, although oxygen-containing hydrocarbons can also be used as well as carbon oxides. Non-limiting examples of such compounds comprise hydrocarbons, including aromatic hydrocarbons, e.g. benzene, toluene, xylene, cumene, ethylbenzene, naphthalene, phenanthrene, anthracene or mixtures thereof; non-aromatic hydrocarbons, e.g., methane, ethane, ethylene, acetylene, propane, propylene, butane, butene, butadiene, pentane, pentene, cyclopentadiene, hexane, cyclohexane, or mixtures thereof, and oxygen-containing hydrocarbons, e.g. alcohols such as methanol or ethanol, ketones such as acetone, and aldehydes such as formaldehyde or acetaldehyde or mixtures thereof; and include carbon oxides, e.g., carbon monoxide and carbon dioxide.

In accordance with the present invention, the catalyst should be capable of being influenced by the magnetic field of the device at the temperature employed in the production of the carbonaceous articles. Suitable catalysts include, for example, transition metal-based catalyst, such as chromium, molybdenum, iron, nickel, cobalt, etc. and alloys thereof. The catalysts useful in the present inventive process can also include multi-metallics. The multi-metallics can comprise, for example, a first metal selected from the metals of Group IB of the Periodic Table of the Elements, and a second metal selected from the group of iron, molybdenum, nickel, cobalt, zinc, or mixtures thereof. Group IB metals that can be used as catalysts include copper, silver, and gold. The Group IB metals can be present in an amount ranging from about 0.5 to 99 atomic % (at. %). A third metal can also be present in the alloy or multi-metallic, such as a metal selected from the group of titanium, tungsten, tin and tantalum. In one aspect of the present invention, the catalyst comprises copper in combination with iron, nickel, or cobalt.

In an embodiment of the present invention the catalyst comprises iron and copper. Alternatively, the catalyst comprises iron in combination with molybdenum in an atomic ratio of 6:1. It is believed that such iron molybdenum catalysts produce single-wall nanotubes.

The catalyst need not be in an active form before entry in to the chamber, so long as it can be readily activated through a suitable pretreatment or under reaction conditions. The choice of a particular series of pretreatment conditions depends on the specific catalyst and carbon-containing precursor used. For example, a metal-containing catalyst can be precipitated as its metal oxides, hydroxides, carbonates, carboxylates, nitrates, etc., for optimum physical form. Colloidal techniques for precipitating and stabilizing uniform, very small catalyst particles are well-known. Further details can be obtained from U.S. Pat. No. 5,165,909 to Tennent et al. and references cited therein.

These catalyst particles may be deposited-on chemically compatible supports. Such supports should not poison the catalyst, should be easily separated if necessary from the carbonaceous products after they are formed and should not interfere with the magnetic field. In an embodiment of the present invention, the catalyst is supported on a chemically compatible porous substrate, such as a refractory support. Alumina, carbon, quartz, silicates, and aluminum silicates such as mullite may be suitable support materials. For ease of removal, their preferred physical form is thin films or plates that can easily be moved into and out of the apparatus. It is further contemplated that carbon fibers or preformed carbon fibrils may be suitable support material. Supported catalysts can be prepared by conventional techniques well know in the art. Non-limiting examples of such techniques include incipient wetness, vaporization, and electrolytic deposition.

In practicing the present invention, carbonaceous articles are formed in the chamber by contacting a carbon-containing precursor with a catalyst while applying a magnetic field near the catalyst during the formation of the carbonaceous article. Contacting the carbon-containing precursor with the catalyst at sufficient temperatures causes carbon deposits to form on the catalyst. By continually causing the deposition of carbon, the growth of an elongated article having opposing ends is produced, where a proximal end is at the catalyst and a distal end is away from the catalyst. The distal end, i.e., the end away from the catalyst, continues to grow due to continual deposition of carbon at the proximal end, i.e., the end including the catalyst, during the process until the desired elongated structure is achieved. Pure, carbon-based articles, i.e., articles comprising no less than 90 at. % of carbon, e.g., no less than 95 at. % carbon, substantially free of metals or catalyst contaminants, can be produced by simply physically separating the grown carbonaceous materials from the catalyst.

The carbonaceous articles formed by the present invention comprise over 90 at. % carbon, the remaining components being mostly residual atoms of the starting precursor material. In an embodiment of the present invention, the carbonaceous articles that are separated from on the catalyst contain no more than 10 wt % metal contaminants, e.g. no more than about 5 wt % of metal impurities.

Reaction parameters, in addition to the particular precursor, include catalyst composition and pretreatment, catalyst support, precursor temperature, catalyst temperature, reaction pressure, residence time or growth time, and feed composition, including the presence and concentrations of any diluents (e.g., Ar) or compounds capable of reaction with carbon to produce gaseous products (e.g., $CO_2$, $H_2$, or $H_2O$). It is contemplated that the reaction parameters are highly interdependent, and that the appropriate combination of the reaction parameters will depend on the precursor and catalyst for the article intended to be fabricated.

In practicing the present invention, the carbonaceous structures can be produced by contacting a suitable carbon containing precursor with the catalyst at elevated temperatures for an effective amount of time. By an effective amount of time, it is meant for that amount of time needed to produce the desired elongated structure. This amount of time will generally be from about several seconds to as long as several days depending upon the precursor, catalyst, magnet and desired article. In an embodiment of the present invention, the precursor is contacted with the catalyst for about 90 minutes.

The reaction temperature should be high enough to cause the catalyst to form carbonaceous materials, yet low enough to avoid significant thermal decomposition of the gaseous carbon-containing precursor with formation of pyrolytic carbon. The precise temperature limits will depend on the specific catalyst system and precursor used. In an embodiment of the present invention, the chamber is maintained at a temperature from the decomposition temperature of the carbon-containing compound to the deactivation temperature of the catalyst. Generally, this temperature will range from about 100° C. to about 1000° C., and preferably from about 570° C. to about 800° C.

It is contemplated that the chamber housing the catalyst be maintained so that that catalyst can be influenced by the magnetic field. For example, when employing transition metal based catalyst, the temperature of the catalyst is maintained below the Curie temperature of the particular transition metal being used. The Curie temperature is the temperature above which a metal or metal catalyst becomes non-magnetic. For iron (Fe), the Curie temperature is approximately 1000° C., for cobalt (Co) the Curie temperature is approximately 900° C. and for nickel (Ni) the Curie temperature is approximately 600° C. Nickel is the least preferred of the three primary transition metal catalysts for use with the present invention because of its low Curie temperature, above which the magnetic fields created by the magnet would have little effect in holding the catalyst in place.

In an embodiment of the present invention, carbon nanofibers can be produced by passing a hydrocarbon gas, e.g. methane, ethylene, etc., or a carbon oxide through apparatus 10 having nanosized metal catalyst on a porous aluminum substrate at elevated temperatures of about 700–1000° C. It is believed that by this process nanotubes grow around the catalyst as the precursor decomposes. The growth stops when the precursor is no longer fed into the chamber. A magnetic field of at least several hundred gauss, e.g., no less than about 300 gauss, acts on the catalyst nanoparticles to hold the catalyst nanoparticles to the substrate, i.e., the magnetic field prevents the catalyst nanoparticles from migrating or drifting away from the substrate during growth of the nanotubes. After growing the nanotubes, the top part of the grown nanotubes can be removed from the catalyst bed and the same catalyst bed containing the same catalyst nanoparticles can be used repeatedly, thereby increasing the nanotube yield per the catalyst nanoparticles.

The produced carbonaceous material can be removed from the catalyst by any practical method, e.g. as by scraping the surface of the catalyst. In an embodiment of the present invention, the catalyst bed is removed from the apparatus and the carbonaceous material, e.g., nanotubes, are detached from just above the substrate containing the catalyst nanoparticles, as by mechanically cutting the carbonaceous material just above the catalyst surface. After the nanotubes are harvested, the catalyst bed is returned to the apparatus and the process continues with the introduction of the precursor. Alternatively, the produced nanotubes can be detached and removed from the catalyst bed without removing the catalyst bed from the apparatus.

Figure 3:
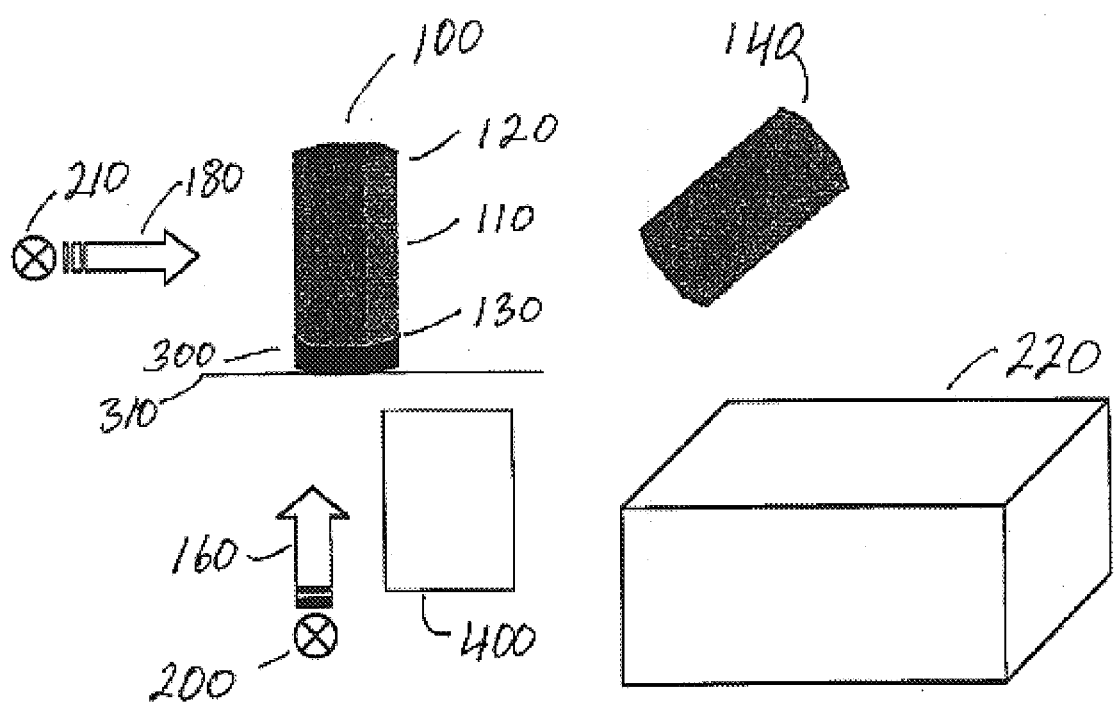
FIG. 3 shows a schematic, blow-up view of a portion of an embodiment of an apparatus of the present invention.

The present inventive methods allow for the formation of carbonaceous articles without the need for elaborate purification processes to remove catalyst impurities. As schematically illustrated in the embodiment shown in FIG. 3, a carbon nanotube 100 is grown from nanosized catalyst 300 on substrate 310 by contacting carbon containing precursor 160 regulated by switch 200 while applying a magnetic field from device 400. The produced nanotube has an elongated portion 110 and distal end 120 that comprise predominantly atomic carbon and may also contain residual atoms derived from the starting precursor. Nanotube 100 also includes a proximal end 130 that is attached or incorporates catalyst 300 from which it was produced.

In accordance with an embodiment of the present invention, the final carbonaceous article can be physically separated from the catalyst as by operating switch 210 to inject a stream of gas 180 to separate carbon nanotube 100 from catalyst 300 to produce a pure carbon-based article 140. The gas can be any gas that does not interfere with the process, such as an inert gas. The article can be collected in a receptacle or a container 220 and the entire process repeated to manufacture high purity carbonaceous articles in high yield and efficiency. In an embodiment of the present invention, the elongated portion and distal end comprise less than about 5 wt % catalyst or metal impurities, e.g., approximately 1 wt % to about 2 wt % catalyst or metal impurities.

There is no need to further seed substrate 310 with catalyst nanoparticles 300 before resuming the process because device 400 magnetically holds the catalyst nanoparticles 300 to substrate 310. Further, there is no need to treat the harvested nanotubes 140 to remove catalyst.

EXAMPLE

An apparatus was constructed by assembling a catalyst bed in a quartz tube in a furnace together with a magnet. The catalyst was made by combining iron nitride with copper nitride to form a iron (Fe) to copper (Cu) based catalyst in a ratio of Fe:Cu of about 7:3. The catalyst was placed on a quartz substrate to form a catalyst bed, which in turn was placed in the quartz tube having a length of approximately 100 cm and a diameter of about 3.8 cm (obtained from Technical Glasses Co., USA). The quarts tube was placed in the interior of a furnace obtained from Carbolite Co. (UK) that had a gas inlet port. An Al—Ni—Co Alnico magnet (obtained from VWR Comp., USA) capable of generating a magnetic field of about 1000 gauss was disposed beneath the quarts tube at a distance of approximately 4 mm from the catalyst bed located within the quarts tube. It is believed that the magnetic field around the catalyst was about 300 gauss. Alternatively, a Samarium Cobalt (SmCo) magnet capable of generating a magnetic field of about 5,000 gauss can be used.

A carbonaceous article was made by contacting ethylene gas as a carbon-containing precursor (obtained from MG Industry) with the catalyst at a temperature of about 570° C. while applying a magnetic field produced from the magnet in the furnace to from a carbon mass on the surface of the catalyst bed. Subsequent characterization of the produced carbon-based material using the Fe:Cu catalyst showed a high amount of carbon and relatively low amounts of iron and copper in the produced carbon material, i.e. the carbon fibers, on the surface of the catalyst bed.

After separating the carbon mass from the catalyst bed, characterization of the catalyst bed, i.e. the catalyst and substrate, showed that there existed a low amount of carbon and high amounts of iron and copper remaining in the catalyst bed. Together, the analysis demonstrates that carbon fibers are formed on the surface of the catalyst bed and that the catalyst, in this case the 7:3 Fe:Cu catalyst, is confined or fixed to the substrate with the application of a magnetic field near the catalyst bed.

The present invention provides enabling methodology for fabricating carbonaceous articles with improved yield, purity and efficiency. In accordance with embodiments of the present invention, a carbon containing source is contacted with a catalyst that is magnetically inhibited from migrating along the growing carbonaceous articles. During fabrication, very little or no catalyst is incorporated in the grown portion of the elongated carbonaceous structures, thereby reducing the need for farther purification of the produced products and reducing the need to regenerate the catalyst.

The present invention enjoys industrial applicability in manufacturing various types of carbonaceous structures, particularly carbon nanotubes in high yield and substantially free of metal impurities and in a process that improves the efficiency of the catalyst by minimizing loss thereof during the production of the products.

In the preceding detailed description, the present invention is described with reference to specifically exemplary embodiments thereof. It will, however, be evident that various modifications and changes may be made thereto without departing from the broader spirit and scope of the present invention, as set forth in the claims. The specification and drawings are, accordingly, to be regarded as illustrative and not restrictive. It is understood that the present invention is capable of using various other combinations and environments and is capable of changes or modifications within the scope of the inventive concept as expressed herein.

What is claimed is:

1. A method of growing a carbon fiber, the method comprising:
    contacting a carbon-containing precursor with a catalyst bed to form a carbon-based fiber;
    applying a magnetic field near the catalyst bed during the formation of the fiber to substantially confine the catalyst to the bed; and
    separating the formed fiber from the metal catalyst bed.

2. The method according to claim 1, comprising applying the magnetic field at a distance to produce a magnetic field of about several hundred gauss to influence the catalyst.

3. The method according to claim 1, comprising applying a magnetic field of no less than about 100 gauss.

4. The method according to claim 1, comprising heating the metal catalyst bed from about 100° C. to about 1000° C.

5. The method according to claim 1, comprising contacting the catalyst bed with a hydrocarbon as the carbon-containing precursor.

6. The method according to claim 1, comprising contacting the carbon-containing precursor with an iron, nickel or cobalt-based catalyst.

7. The method according to claim 1, comprising forming a fiber having a cross-section of less than one micron.

8. The method according to claim 1, comprising:

contacting the carbon-containing precursor with a nano-sized metal catalyst at a temperature of from about 100° C. to about 1000° C. to form a nanostructured carbon-based fiber having an aspect ratio of at least 2; and applying a magnetic field of at least 100 gauss near the catalyst bed during the formation of the fiber.

9. A method of a using a catalyst in a catalyst bed for growing a carbon-based fiber, the method comprising:

contacting a carbon-containing precursor with a catalyst bed to form a first carbon-based fiber;

applying a magnetic field near the catalyst bed during the formation of the first carbon-based fiber to substantially confine the catalyst to the bed;

separating the formed first carbon-based fiber from the catalyst bed; and reusing the catalyst bed to form a second carbon-based fiber.

10. The method according to claim 9 comprising reusing the catalyst bed to form the second carbon-based fiber without adding catalyst to the catalyst bed.

11. A method of manufacturing a carbonaceous article, the method comprising:

contacting a carbon-containing precursor with a metal catalyst to form the carbonaceous article;

applying a magnetic field near the metal catalyst during the formation of the carbonaceous article; and separating the formed carbonaceous article from the catalyst by applying a stream of gas.

* * * * *